(12) United States Patent
Luo

(10) Patent No.: US 10,026,017 B2
(45) Date of Patent: Jul. 17, 2018

(54) SCENE LABELING OF RGB-D DATA WITH INTERACTIVE OPTION

(71) Applicant: THOMSON LICENSING, Issy les Moulineaux (FR)

(72) Inventor: Tao Luo, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 93 days.

(21) Appl. No.: 15/289,830

(22) Filed: Oct. 10, 2016

(65) Prior Publication Data

US 2017/0109611 A1 Apr. 20, 2017

(30) Foreign Application Priority Data

Oct. 16, 2015 (EP) ..................................... 15306661

(51) Int. Cl.
*G06K 9/62* (2006.01)

(52) U.S. Cl.
CPC ........... *G06K 9/6263* (2013.01); *G06K 9/624* (2013.01); *G06K 9/628* (2013.01); *G06K 9/6262* (2013.01); *G06K 9/6293* (2013.01)

(58) Field of Classification Search
CPC .......................... G06T 7/00; G06T 7/10–7/194
See application file for complete search history.

(56) References Cited

U.S. PATENT DOCUMENTS

| 8,374,979 | B2 | 2/2013 | Zhou et al. | |
| 8,422,797 | B2 * | 4/2013 | Heisele | G06K 9/00208 382/159 |
| 8,611,585 | B2 * | 12/2013 | Zhang | G06K 9/00805 382/100 |
| 8,798,965 | B2 * | 8/2014 | Quan | G06T 17/05 345/419 |
| 9,177,391 | B1 * | 11/2015 | Dorner | H04N 1/644 |
| 9,317,735 | B2 * | 4/2016 | Watanabe | G06K 9/00201 |
| 9,715,640 | B2 * | 7/2017 | Xu | G06F 21/32 |

(Continued)

FOREIGN PATENT DOCUMENTS

| EP | 2874097 | 5/2015 |
| WO | WO2012012943 | 2/2012 |

OTHER PUBLICATIONS

"RGB-(D) scene labeling: Features and algorithms."; 2012 IEEE Conference on Computer Vision and Pattern Recognition Computer Vision and Pattern Recognition (CVPR), 2012 IEEE Conference on. :2759-2766 Jun. 2012; Xiaofeng Ren, Liefeng Bo, Fox, D.*

(Continued)

*Primary Examiner* — Michael Osinski
(74) *Attorney, Agent, or Firm* — Brian J. Dorini; Patricia A. Verlangieri

(57) ABSTRACT

A method for generating labels for an image of low quality is described. The method includes mapping image data and depth information of said image to a 3D point cloud; segmenting the 3-D point cloud and the image into super voxels and image patches, fusing features obtained from the super voxels and image patches, by using a fusion model, applying classifiers to fused features, wherein the fusion model and the classifiers are generated from a dataset including image data of selected quality and quantity, corresponding point cloud and image labels, and generating scene labels based on applied classifiers.

13 Claims, 2 Drawing Sheets

(56) References Cited

U.S. PATENT DOCUMENTS

| | | | | |
|---|---|---|---|---|
| 9,754,160 | B2* | 9/2017 | Wang | G06K 9/00778 |
| 9,786,070 | B2* | 10/2017 | Chen | G06T 11/20 |
| 2008/0310717 | A1* | 12/2008 | Saathoff | G06K 9/342 |
| | | | | 382/173 |
| 2010/0086218 | A1* | 4/2010 | Tateno | G06K 9/00208 |
| | | | | 382/203 |
| 2010/0104137 | A1* | 4/2010 | Zhang | G06K 9/00798 |
| | | | | 382/104 |
| 2011/0235897 | A1* | 9/2011 | Watanabe | G06K 9/00214 |
| | | | | 382/154 |
| 2012/0041722 | A1* | 2/2012 | Quan | G06T 17/05 |
| | | | | 703/1 |
| 2012/0133664 | A1 | 5/2012 | Zhu et al. | |
| 2013/0127824 | A1* | 5/2013 | Cohen | G06T 7/12 |
| | | | | 345/419 |
| 2013/0147911 | A1* | 6/2013 | Karsch | H04N 13/026 |
| | | | | 348/43 |
| 2013/0293532 | A1* | 11/2013 | Vaddadi | G06T 15/005 |
| | | | | 345/419 |
| 2015/0003723 | A1* | 1/2015 | Huang | G06K 9/6212 |
| | | | | 382/154 |
| 2015/0145966 | A1* | 5/2015 | Krieger | H04N 13/0018 |
| | | | | 348/47 |
| 2016/0217225 | A1* | 7/2016 | Bell | G06F 17/5004 |
| 2016/0247287 | A1* | 8/2016 | Inaba | G06T 7/0057 |
| 2016/0335491 | A1* | 11/2016 | Wang | G06K 9/00369 |
| 2016/0371539 | A1* | 12/2016 | Ming | G06K 9/00268 |
| 2016/0379370 | A1* | 12/2016 | Nakazato | G06K 9/4604 |
| | | | | 382/103 |
| 2017/0236013 | A1* | 8/2017 | Clayton | G06K 9/00805 |
| | | | | 382/104 |
| 2017/0249783 | A1* | 8/2017 | Mach Shepherd | G06T 19/20 |

OTHER PUBLICATIONS

"Detection-based object labeling in 3D scenes."; 2012 IEEE International Conference on Robotics and Automation Robotics and Automation (ICRA), 2012 IEEE International Conference on.:1330-1337 May 2012.; Lai, K., Liefeng Bo, Xiaofeng Ren, Fox, D.*

"Labeling Complete Surfaces in Scene Understanding."; International Journal of Computer Vision. Apr. 2015, vol. 112 Issue 2, p. 172-187. 16p. 6 Color Photographs, 2 Diagrams, 5 Charts, 5 Graphs; Ruiqi Guo, Derek Hoiem.*

Ross et al., "Information fusion in biometrics", Pattern Recognition Letters, vol. 24, No. 13, Sep. 2003, pp. 2115-2125.

Pan et al., "Exploiting the Dependencies in Information Fusion", Proceedings of the 1999 IEEE Computer Society Conference on Computer Vision and Pattern Recognition, Jun. 23, 1999, vol. 2, pp. 407-412.

Chibelushi et al., "Feature-Level Data Fusion for Bimodal Person Recognition", International Conference on Image Precessing and Its Applications, vol. 1, Jul. 14, 1997, pp. 399-403.

Wang et al., "Multi-modal Unsupervided Feature Learning for RGB-D Scene Labeling", European Conference on Computer Vision, Zurich Switzerland, Sep. 6, 2014, pp. 453-467.

Liu et al., "Towards 3D Object Detection With Bimodal Deep Boltzmann Machines Over RGBD Imagery", 2015 IEEE Conference on Computer Vision and Pattern Recognition (CVPR), Boston, Massachusetts, USA, Jun. 7, 2015, pp. 3013-3021.

Ak et al., "Scene Segmentation and Labeling using Multi-hypothesis Superpixels", 2015 23rd Signal Processing and Communications Applications Conference, Malatya, Turkey, May 16, 2015, pp, 1-4. English Abstract.

Romero et al., "A Probabilistic Methodology for Multilabel Classification", Intelligent Data Analysis, vol. 18, No. 5, 2014, pp. 911-926.

Lai et al., "Unsupervised Feature Learning for 3D Scene Labeling", 2014 IEEE International Conference on Robotics & Automation, Hong Kong, China, May 31, 2014, pp. 3050-3057.

\* cited by examiner

SCENE LABELING OF RGB-D DATA WITH INTERACTIVE OPTION

REFERENCE TO RELATED EUROPEAN APPLICATION

This application claims priority from European Application No. 15306661.8, entitled, "Scene Labeling Of RGB-D Data With Interactive Option", filed on Oct. 16, 2015, the contents of which are hereby incorporated by reference in its entirety.

TECHNICAL FIELD

This disclosure relates to labeling a scene in an image and its 3D space and to labeling a scene represented by red, green, and blue color data and depth information (RGB-D).

BACKGROUND ART

Scene labeling constitutes an important step in understanding a scene generated electronically. In practice, electronic devices and systems assign a corresponding category label to each pixel in image or each point in 3D point cloud, then jointly finalize the scene segmentation, and object recognition. Scene labeling has diverse applications, such as use by autonomous robots, augmented reality, etc. For both indoor scenes and outdoor scenarios, scene labeling becomes challenging due to light conditions, occlusion, and complicated textures. The emergence of various depth sensors, such as those found in RGB-D cameras, makes it convenient to acquire color and depth information simultaneously, which helps improve the accuracy and robustness of scene labeling. However, mobile devices (e.g. Google Tango) provide depth data of low quality due to the limitations of power-consumption and computability compared with specialized RGB-D cameras like Kinect.

Techniques now exist for segmenting or labeling the objects in a cluttered scene using an RGB-D data representation. Such present day techniques make use of category classifiers learned from a training dataset with ground-truth labels. However, present day labeling techniques suffer from the problem of how to represent the features from the sensor data. Traditionally, handcrafted features rely on individual color and depth data, making it difficult to extend such techniques to different modalities and to exploit cross-modality information. Thus, the performance of such scene labeling relies on the selection and combination of handcrafted features. In addition, some techniques rely on unsupervised feature learning methods to learn sophisticated feature representations in order to improve algorithm performance and fuse the color and depth data.

The publication, K. Lai, et al., *Unsupervised Feature Learning for 3D Scene Labeling*, ICRA'14, proposes a hierarchical sparse coding method to learn features from a 3D point cloud. The training of classifiers described in this paper relies on a synthetic dataset of virtual scenes separately generated using CAD models. The training of classifiers occurs using RGB-D images and the classifiers are combined with classifiers trained from 3D data. Wang et al., in their paper, *Multi-Model Unsupervised Feature Learning for RGB-D Scene Labeling*, ECCV'14 propose learning features from color and depth information in a joint manner via an unsupervised learning framework. These two papers regard color and depth information as a direct concatenation during classifying or feature learning.

More recently, feature learning methods, like convolutional neural networks have found applicability in RGB-D feature learning. Interactive labeling also constitutes an alternative method to overcome low-quality depth data and insufficient benchmark datasets. The paper *SemanticPaint: Interactive 3D Labeling and Learning at your Fingertips*, published by J. Valentin et al. at ToG'15 describes a state-of-the-art labeling technique wherein users simultaneously scan the environment and interactively segment scenes by reaching out and touching desired objects or surfaces. However, this technique has proven hard to implement in cluttered and large scenes with the objects out of the user's reach and forbidden to touch. O. Milisk et al., in their paper, *The Semantic Paintbrush: Interactive 3D Mapping and Recognition in Large Outdoor Spaces*, CHI'15, proposes using a laser pointer to draw onto a 3D world to semantically segment objects. From the examples interactively labeled, Milisk et al. automatically segments the captured 3D models.

While the above-described segmentation techniques work well with high resolution RGB-D cameras, such techniques do not work well with mobile devices such as Google Tango, which capture images with low quality 3D data.

Thus, a need exits for a scene labeling technique that overcomes the aforementioned disadvantages of the prior art and especially the ability to utilize low quality 3D data from mobile devices.

BRIEF SUMMARY

It is provided a method for generating labels for an image of low quality; comprising: mapping image data and depth information of said image to a 3D point cloud; segmenting the 3-D point cloud and the image into super voxels and image patches; fusing features obtained from the super voxels and image patches, by using a fusion model; applying classifiers to fused features, wherein the fusion model and the classifiers are generated from a dataset including image data of selected quality and quantity, corresponding point cloud and image labels; and generating scene labels based on applied classifiers.

It is an object of the present principles to provide a technique for real-time scene labeling that can accommodate captured images and low-quality 3D data from mobile devices and the like.

It is another object of the present invention to provide a scene labeling technique that enables a user to correct the labeling results automatically, to improve the performance of trained classifiers.

DETAILED DESCRIPTION

Figure 1:
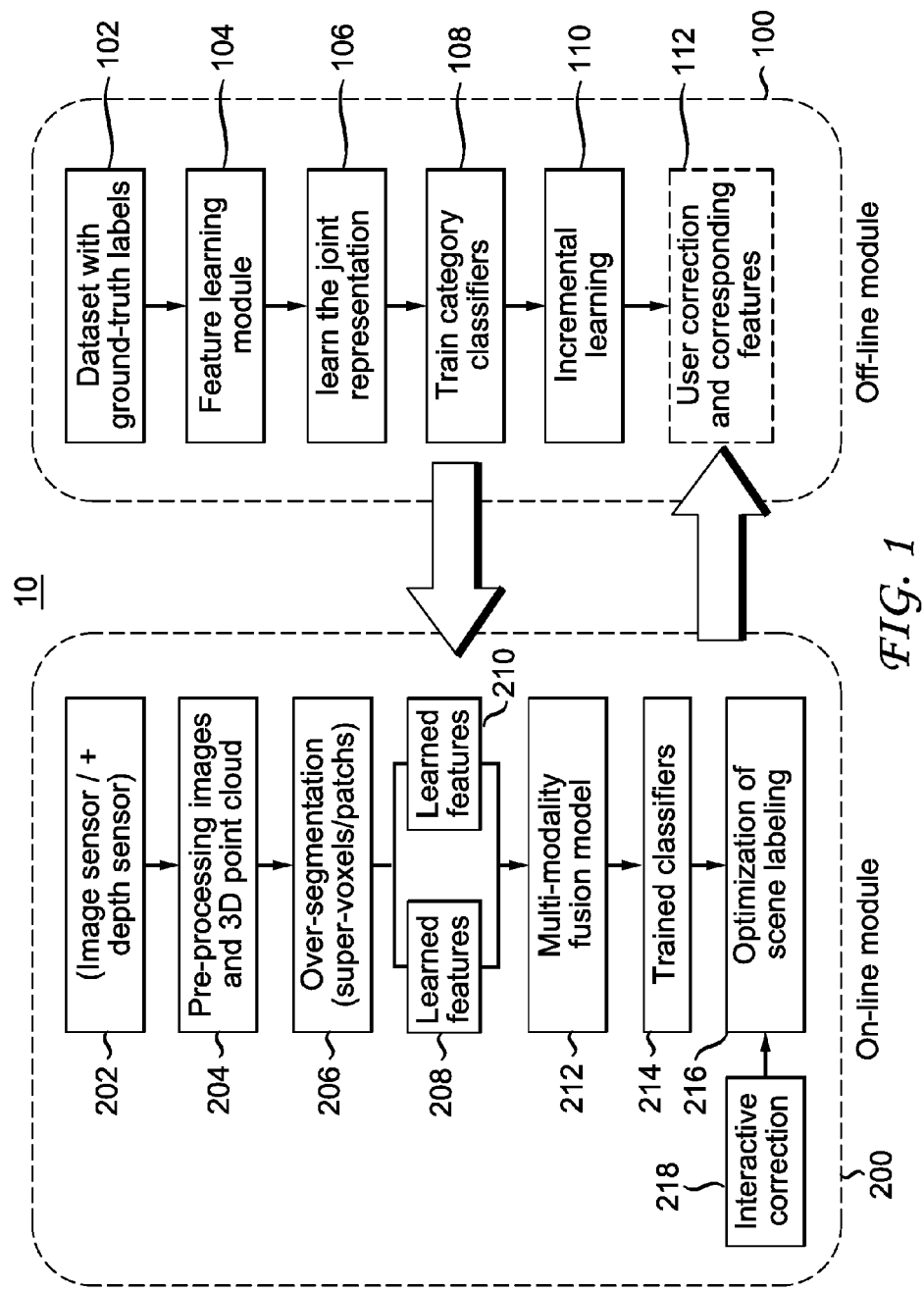
FIG. 1 depicts a block schematic diagram of a system for accomplishing scene labeling in accordance with an embodiment of the present principles.

FIG. 1 depicts a system 10 for accomplishing scene labeling in accordance with the present principles. The system 10 typically takes the form of one or more processors (computers) along with various peripheral devices, such as a key board, mouse, monitor and the like, (all not shown), together with supporting elements, such as power supplies, network communications interfaces and the like (all not shown). Alternatively, the system 10 could take the form of one or more dedicated integrated circuits and or programmable arrays.

The system 10 includes two modules, an off-line module 100 and an on-line module 200. In the event the system takes the form of a single processor, the two modules 100 and 200 could take the form of separate software programs. Alternatively, the system 10 could take the form of separate processors (not shown), each implementing a separate one of off-line and on-line modules 100 and 200, respectively. In other embodiments of the system 10, the off-line and on-line modules 100 and 200, respectively, could take the form of separate hardware and/or firmware elements.

As discussed in detail hereinafter, the off-line module 100 contains elements (software, hardware, and/or firmware or the combination thereof) that operate to learn a multi-modality fusion model and learn the category classifiers from a training dataset. The on-line module 200 includes elements (software, hardware, and/or firmware or the combination thereof) for performing (1) preprocessing of input data, (2) generating feature representations and fusing such representations based on the pre-processed images and 3D point data for corresponding super-pixels and super voxels, (3) automatic labeling using pre-trained classifiers, and (4) interactive correction by users. As discussed hereinafter, the on-line module 200 could reside in a peripheral electronic appliance having an image sensor, such as a digital still camera, camcorder, television camera, cell phone, smart phone, tablet or laptop computer (e.g., a mobile device). To the extent that the peripheral electronic appliance possesses sufficient computing power, the peripheral electronic device could also include the off-line module 100 as well. However, for peripheral electronic appliances (e.g., mobile devices) with relatively low computing power, the off-line module 100 could reside elsewhere, such as server or computer accessible to the peripheral electronic appliance via a wired or wireless link to permit the peripheral electronic device to receive pre-trained classifiers from the off-line module 100.

The off-line module 100 includes a storage element 102, typically a database or memory that includes a dataset with ground-truth image labels. The dataset comprises image data and its corresponding point cloud. The term "ground truth" as used connection with image labels, refers to a set of labels assumed as highly accurate. In other words, the dataset with ground-truth labels stored in the element 102 has labels that constitute a reference for comparison and training purposes. The Element 104 within the off-line module 100 comprises a feature-learning module for learning features in the dataset stored in the element 102. Learning of the features in the data set by the module 104 can occur using an existing unsupervised or supervised feature-learning framework. In practice, the module 104 learns by first generating super-voxels from the dataset. For each super-voxel, there exist corresponding image patches from the captured image frames. The module 104 then extracts features from each super-voxel and image patch, separately. Thus, the dataset is represented using multi-modality features from 3D point cloud and images. A module 106 makes use of the multi-modality features learned by the module 104 to learn a joint representation to get a feature fusion model, typically using the bimodal Deep Boltzmann machine method, which provides learned parameters to the on-line module 200.

Using the learned joint representation established by the module 106, a module 108 trains category classifiers based on a public RGB-D dataset using known machine learning methods, such as the exemplar-SVM method. Note that the quality and quantity of selected training data will limit the performance of the off-line module 100. For example, consider an indoor scene captured by an RGB-D camera (not shown). The size of the dataset for the image classification task will significantly exceed the existing 3D benchmark datasets. The insufficient dataset can cause lower accuracy of labeling.

Further, the off-line module 100 also includes an incremental learning module 110 that interfaces with the module 108. The learning module 110 also interfaces to a correction module 112. Using the correction module 112, a user can enter correction data to the learning module 110 to update the trained classifiers.

Each of the modules 104-112 in the off-line module 100 can take the form of one more hardware elements, software or firmware or combination thereof. Each of the modules 104-112 appears separately for the sake of simplicity in order to describe its functionality. However, the individual functions associated one or more of the modules 104-112 could be combined into fewer modules or even a single module (not shown).

The on-line module 200 includes an image sensor and depth sensor 202, typically an RGB-D sensor as known in the art. The RGB-D data generated by the sensor 202 undergoes pre-processing by a module 204 to remove noise and outliers before mapping the image data and depth into a 3D-point cloud. The module 2014 can also compensate the 3D data to improve the quality of point cloud. A module 206 then segments the 3D point cloud produced by the module 204 into super-voxels, typically using an octree representation. The module 206 projects each super-voxel to frames in the image with corresponding viewpoints to obtain the corresponding image patches for that super-voxel.

Modules 208 and 210 learn features in the image and 3D point cloud, respectively over each super-voxel. In practice, the modules 208 and 210 learn the features using the same framework as in the off-line module 100. A module 212 receives the learned features from the modules 208 and 210 and fuses them together to generate a joint feature representation using a learned fusion model typically received from the off-line module 100. The joint representation fully exploits the cross-modality information and offers better results than simple concatenation of features.

A module 214 receives the fused features and makes use of trained classifiers from the offline module input 100 to establish the probability of category labeling. An optimization module 216 generates the scene labeling with a smoothness constraint obtained from the probability information from the module 216. In practice, the optimization module 214 can generate category labels using the Markov Random Field method.

Depending on the sufficiency of training dataset supplied to the offline module 100, the trained classifiers might not offer the degree of desired robustness. In other words, further refinement of the final scene labeling and updating of the trained classifiers may become necessary. To the end, the on-line module 200 includes an interactive correction module 218 coupled to the optimization module 216 that enables a user to refine the scene labeling automatically. Upon activation by the user to correct one or more category labels, the interactive correction module 218 updates a display of the final scene labels based on the user input. In turn, the interactive correction module 218 sends correction feedback together with the learned features corresponding to the corrected super-voxels, to the off-line module 100 to update the classifiers. If the peripheral electronic appliance has sufficient computing power, then that appliance can perform incremental learning. The interactive correction module 218 can also function to initiate re-execution of the scene labeling process using updated classifiers.

Each of the modules 202-218 in the on-line module 200 can take the form of one more hardware elements, software or firmware and/or combination thereof. Each of the modules 202-218 appears separately for the sake of simplicity to describe the function performed thereby. However, the individual functions associated with the one or more modules could be combined into fewer modules or even a single module.

As discussed above, the on-line module 200 can reside within a peripheral electronic appliance, such as a mobile device, having limited computing power. The computational power needed by the off-line module 100 to train classifiers can exceed the computational power of many mobile devices, and for that reason, the off-line module 100 will typically reside in an server (not shown) having a communications link to the mobile device incorporating the on-line module 200. The functionality of the on-line module 200 could be incorporated in a graphical processing unit (not shown) as are well known in the art, to achieve more rapid scene labeling.

Figure 2:
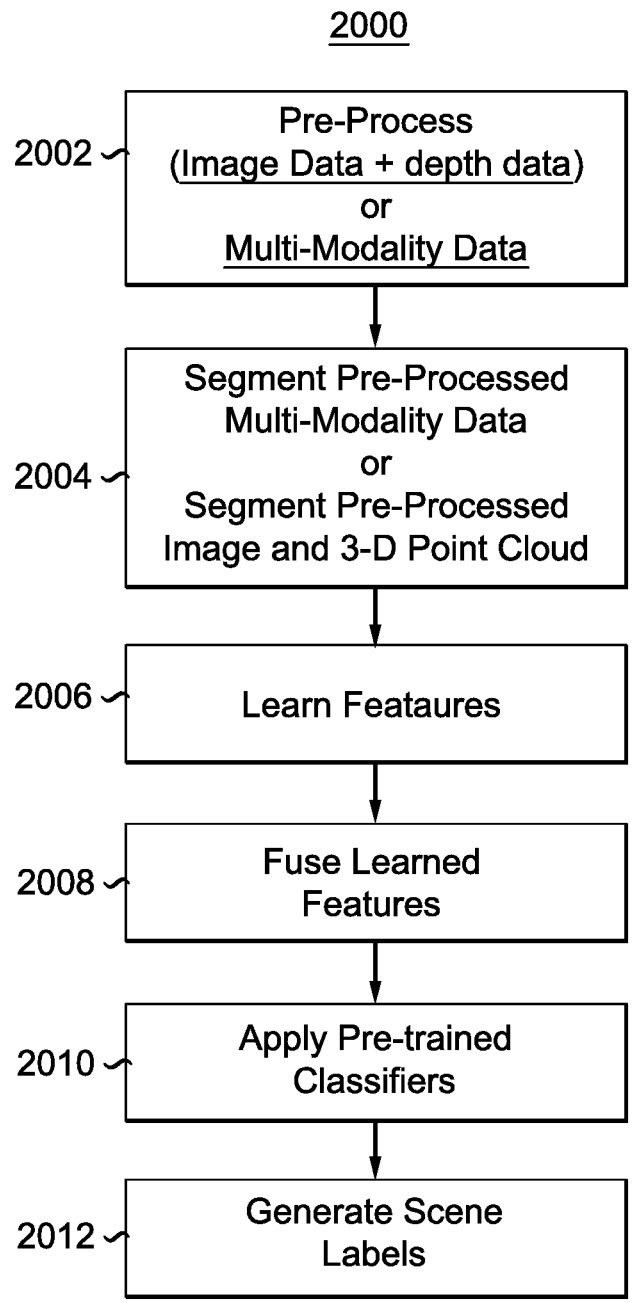
FIG. 2 depicts the steps of a method practiced by the system of FIG. 1 for accomplishing scene labeling in accordance with an embodiment of the present principles.

FIG. 2 depicts in flow chart form the basic steps of the scene labeling method 2000 of the present principles. The method commences by pre-processing of captured data (image and depth data), typically RGB-D data during step 2002. The data can also comprise multi-modality data. The pre-processed data undergoes segmentation during step 2004, typically into super voxels and their corresponding image patches. In this way, multi-modality data is segmented. Features in the segmented data are learned during step 2006, typically features in both the image and 3D point cloud. The learned features are fused together during step 2008 to yield a joint feature representation. Pre-trained classifiers are applied during step 2010 and scene labels are generated during step 2012.

As discussed, the scene labeling technique of the present principles advantageously learns features from images and 3D point cloud data and fuses then to exploit the cross-modality information, which is not a simple concatenation as in the prior art. Further, the scene labeling technique of the present principles enables users the ability to make corrections to improve the capability of classifiers in an incremental learning framework. Thus, the scene labeling technique of the present principles can improve the performance of scene labeling restricted by low-quality 3D image data captured by a mobile device and insufficient benchmark datasets.

The invention claimed is:

1. A method for generating labels for an image, comprising:
    mapping image data and depth information of said image to a three-dimensional (3D) point cloud;
    segmenting the 3D point cloud and the image into super voxels and image patches, respectively;
    fusing features obtained from the super voxels and image patches by using a fusion model;
    applying classifiers to the fused features, wherein the fusion model and the classifiers are generated from a stored dataset including image data having a selected quality and quantity along with corresponding point clouds and image labels; and
    generating scene labels based on the applied classifiers.

2. The method according to claim 1 wherein the image data and depth information comprises red, green and blue color data and depth information.

3. The method according to claim 1 wherein the features are obtained by using one of an unsupervised or a supervised feature learning framework on the image and the 3D point cloud separately.

4. The method according to claim 1 wherein the classifiers are obtained using an exemplar Support Vector Machine (SVM) method.

5. The method according to claim 1 further including interactively correcting the generated scene labels based on user input.

6. The method according to claim 1 wherein the classifiers are updated based on user input.

7. An Apparatus for scene labeling an image, comprising:
    at least one processor configured to
        (a) map image data and depth information of said image to a three-dimensional-(3D) point cloud;
        (b) segment the 3D point cloud and the image into super voxels and image patches, respectively;
        (c) fuse features that are obtained from the super voxels and image patches by using a fusion model;
        (d) apply classifiers to the fused features; and
        (e) generate scene labels based on the applied pre-trained classifiers, wherein the fusion model and the classifiers are generated from a stored dataset including image data having a selected quality and quantity along with corresponding point clouds and image labels.

8. The apparatus according to claim 7 wherein the image data and the depth information comprises red, green and blue color data and depth information.

9. The apparatus according to claim 7 wherein the fusion model comprises a bimodal Deep Boltzman Machine model.

10. The apparatus according to claim 7 wherein the features are obtained using one of an unsupervised or a supervised feature learning framework on the image and the 3D point cloud separately.

11. The apparatus according to claim 7 wherein the classifiers are obtained using an exemplar Support Vector Machine (SVM) apparatus.

12. The apparatus according to claim 7 wherein the processor interactively corrects the generated scene labels based on user input.

13. The apparatus according to claim 7 wherein the processor updates the classifiers based on user input.

* * * * *